United States Patent Office 3,490,910
Patented Jan. 20, 1970

3,490,910
SILVER HALIDE EMULSIONS SENSITIZED WITH CYANINE DYES CONTAINING A TETRA-HYDROBENZO-BENZOXAZOLE NUCLEUS
Emil B. Rauch and Robert T. Shannahan, Binghamton, and Arthur Krieger, Rochester, N.Y., assignors to GAF Corporation, a corporation of Delaware
No Drawing. Filed Feb. 2, 1968, Ser. No. 702,514
Int. Cl. G03c 1/08
U.S. Cl. 96—102     9 Claims

ABSTRACT OF THE DISCLOSURE

Photographic silver halide emulsions sensitized with unsymmetrical cyanine and merocyanine dyes having the tetrahydrobenzo-benzoxazole nucleus coupled with either another nitrogen-containing heterocyclic ring nucleus or to a heterocyclic ring nucleus activated by a carbonyl structure.

---

This application is a continuation-in-part of copending applications Ser. No. 388,668, filed Aug. 10, 1964, Ser. No. 492,864, filed October 4, 1965 and Ser. No. 566,477, filed July 20, 1964.

This invention relates to 2-methyl-tetrahydrobenzo-benzoxazoles; the quaternary salts thereof, reactive intermediates thereof, sensitizing dyes derived therefrom, and silver halide emulsions sensitized with such dyes.

We have found that extremely valuable sensitizing dyes may be prepared from 2-methyl-tetrahydrobenzo-benzoxazoles. These bases, which are readily quaternized by conventional methods, can be converted into reactive intermediates which can be reacted with cyclammonium quaternary salts containing reactive methyl or methylene groups to produce, inter alia, mono-tri and poly-methine cyanine and merocyanine dyes which are valuable sensitizers for silver halide emulsions.

Among the objects of our invention are said bases, their preparation, quaternary salts derived therefrom, sensitizing dyes produced with said quaternary salts, and silver halide emulsions sensitized with said dyes.

The new bases, the preparation and use of which are contemplated herein, are 2-methyl-tetrahydrobenzo-benzoxazoles having the following structures:

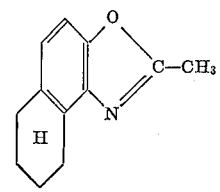

(I)

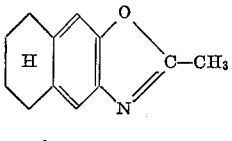

(II)

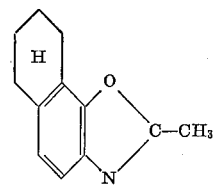

(III)

Compound I is prepared as follows:
2-tetralol is converted by coupling with a diazonium salt such as phenyl diazonium chloride or another suitable aryl diazonium halide such as the diazo derivative of sulfanilic acid into phenylazo-2-tetralol. Reduction with sodium hydrosulfite in alkaline medium leads to the 1-amino-2-tetralol. Finally, refluxing the latter with acetic anhydride or with an acetyl halide, followed by successive distillation of the excess anhydride and of the reaction product yields 2-methyl-4,5-tetrahydrobenzo-benzoxazole. These reactions are illustrated by the following formulae:

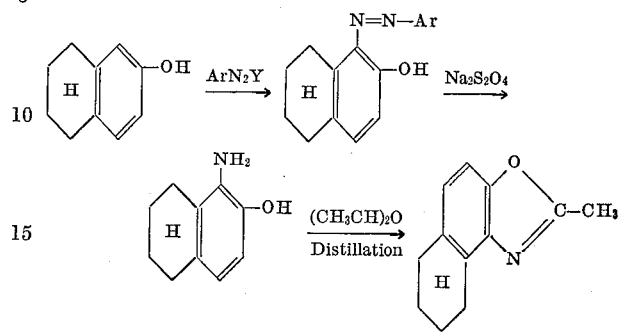

wherein Ar is the aryl residue of the diazonium and Y is an anion such as chloride, bromide, sulfate and the like.

Compound II is prepared as follows:
1-bromo-2-hydroxy-3-nitro-5,6,7,8 - tetrahydronaphthalene is hydrogenated at room temperature and elevated pressure, preferably using palladium on charcoal as a catalyst. The resultant 3-amino-2-hydroxy-5,6,7,8-tetrahydronaphthalene is precipitated with aqueous ammonia and finally refluxed with acetic anhydride or with an acetyl halide. Successive distillation of the excess anhydride or halide and of the reaction product yields the 2-methyl-5,6-tetrahydrobenzobenzoxazole. These reactions are illustrated by the following formulae:

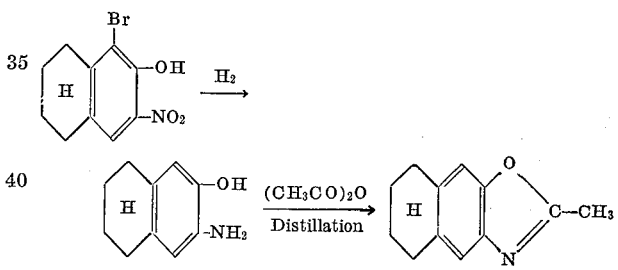

Compound III is prepared as follows:
1-hydroxy-2-nitro - 5,6,7,8 - tetrahydronaphthalene was reduced catalytically by hydrogenation with Raney nickel to form the 1-hydroxy-2-amino-5,6,7,8-tetrahydronaphthalene. Refluxing without previous isolation with acetic anhydride or with an acetyl halide followed by successive distillation of the excess anhydride lead to the acetoxy-2-acetamido-5,6,7,8-tetrahydronaphthalene. Heating the latter for 3 or 4 hours to a temperature above 260° C. and below 300° C., but preferably to 280° C., yielded 2-methyl-6,7-tetrahydrobenzo-benzoxazole. These reactions are illustrated by the following formulae:

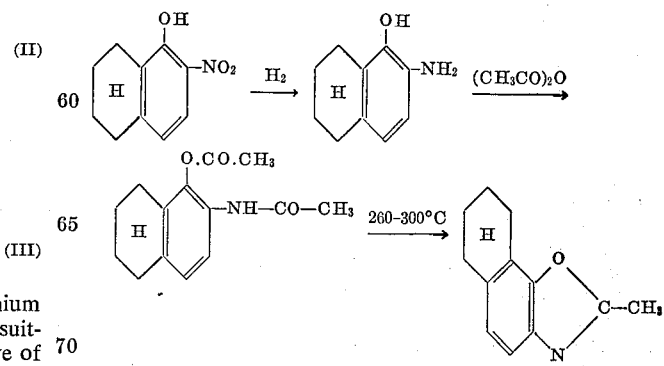

The above obtained 2-methyl-tetrahydrobenzo-benzoxazole bases may be readily quaternized by conventional methods to produce the desired cyclammonium quaternary salts for the cyanine dye synthesis; for instance, the methiodide or ethiodide is obtained by heating the base with methyl or ethyl iodide under pressure in a sealed container for several hours at 96–100° C. The quaternary salts obtained are characterized by the following general formula:

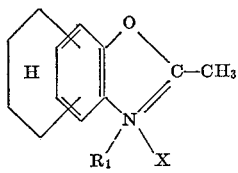

wherein:

represents a tetrahydrobenzo radical fused to the benzoxazole nucleus in 4,5-, 5,6- or 6,7-position, $R_1$ is alkyl such as methyl, ethyl, propyl, β-hydroxyethyl, γ-hydroxypropyl, carboxymethyl, carboxyethyl, and the like; aralkyl, e.g., benzyl, phenethyl and the like, and X is an anion such as chloride, bromide, iodide, perchlorate, p-toluene sulfonate and the like.

Particularly efficacious sensitizing dyes can be produced by the utilization of the tetrahydrobenzo-benzoxazole structure for at least one of the heterocyclic nuclei connected to the polymethine conjugated chain of a sensitizing dye structure. In addition to being able to extend the spectral sensitivity of photographic emulsions, the dyes of this invention are very tenaciously held or adsorbed by the silver halide grain surface. This condition is indeed considered essential since otherwise the dye, if not strongly adsorbed, will tend to be displaced by the various adjuvants normally incorporated into silver halide photographic emulsion, such as, color formers, sensitizers, stabilizers, and the like.

The new dyes of the cyanine and merocyanine series containing at least one tetrahydrobenzo-benzoxazole nucleus can be conveniently represented by the following general formulae:

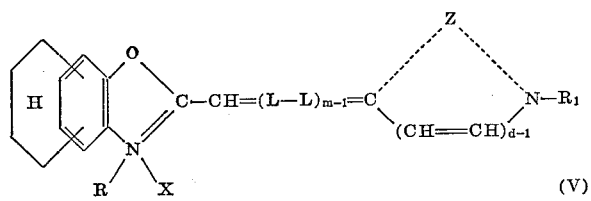

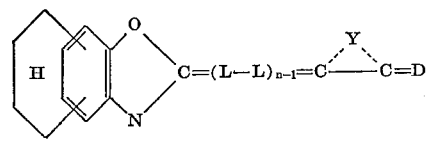

wherein:

represents a tetrahydrobenzo radical fused to the benzoxazole nucleus in 4,5-, 5,6- or 6,7-position, R and $R_1$ represent a lower aliphatic group, such as methyl, ethyl, carboxymethyl, carboxyethyl, propyl, butyl, β-sulfoethyl, 3-sulfopropyl, 4-sulfobutyl, etc., $m$ is an integer of from 2 to 3, $d$ is an integer of from 1 to 2, X is an anion, e.g., halide such as chloride, bromide, or iodide, perchlorate, p-toluenesulfonate, ethyl-thiosulfate, etc., L represents a methine group of the formula $\equiv C—R_4$, wherein $R_4$ represents hydrogen or a lower alkyl group as above for R, $R_1$ and $R_2$; and Z represents the non-metallic atoms necessary to complete a heterocyclic ring system of the type commonly encountered in cyanine dyes such as a thiazole ring, thiazoline, a thiadiazole ring, a benzothiazole ring, a benzoselenazole ring, a benzoxazole ring, an indolenine ring, a quinoline ring, a pyridine ring, a benzimidazole ring, a benzisoxazole ring, etc.; D represents a member selected from the group consisting of oxygen and sulfur, L represents a methine group, $n$ represents a positive integer of from 2 to 3, and Y represents the non-metallic atoms necessary to complete a heterocyclic nucleus containing from 5 to 6 atoms in the heterocyclic ring. More particularly, in the aforesaid general formula, Y represents the non-metallic atoms necessary to complete a 3-alkylrhodanine nucleus, a 3-arylrhodanine nucleus, a 2-dialkylamino-4(5)-thiazolone nucleus, a 2-diphenylamino-4(5)-thiazolone nucleus, a 3-alkyl-2-thio-2,4(3,5)-oxazoledione nucleus, a 1,3-diphenyl-2-thiohydantoin nucleus, a 3-alkyl-1-phenyl-2-thiohydantoin nucleus, a 2-thiobarbituric acid nucleus, a pyrazolone nucleus, etc.

The carbocyanine dyes represented by Formula V, i.e., when $m=2$, can advantageously be prepared by condensing a 2-(β-aniline vinyl)-tetrahydrobenzo-benzoxazolium salt of the following formula:

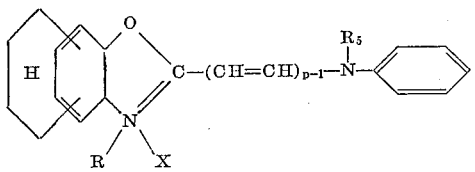

wherein:

represents a tetrahydrobenzo radical fused to the benzoxazole nucleus in 4,5-, 5,6- or 6,7-position, $p$ is 2; R and X each have the values given above, and $R_5$ is hydrogen or an acyl e.g. acetyl or proponyl group, together with a cyclammonium quaternary salt of the following general formula:

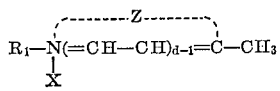

wherein $R_1$, X, L, and Z have the values as set forth above, and $d$ is equal to 2. The dye reactions are advantageously carried out in the presence of a basic condensing agent, that is, an acid binding agent, such as a tertiary organic amine, i.e., trialkylamines as represented by triethylamine and the like. In some instances, it may be desirable to carry out the dye condensations in the presence of lower molecular weight aliphatic alcohols, such as ethyl, N-propyl, etc. The application of heat, particularly under reflux conditions, accelerates the dye reactions. Examples of cyclammonium quaternary salts of Formula VII for producing carbocyanines as represented by Formula V are the cyclammonium quaternary salts containing a β-aryl-acylaminovinyl (e.g. β-acetanilidovinyl, β-anilino vinyl or β-acylanilino vinyl group and the like.

For producing dicarbocyanine dyes of the type represented by Formula V, wherein $m$ equal 3, cyclammonium quaternary salts of the type represented by Formula VII are selected in which $p=3$. Examples of these quaternary salts are the 4-arylamino-1,3-butadienyl cyclammonium quaternary salts having in the reactive position such groups as 2(4-anilino-1,3-butadienyl), (4-p-chloroanilino-1,3-butadienyl), etc. The dye condensations for preparing dicarbocyanines are carried out under basic conditions in the manner described for the preparation of carbocyanine dyes.

The merocyanine dyes of the type represented by Formula VI wherein $n$ is 2, can be produced by condensing a cyclammonium quarternary salt of the type represented by Formula VII with a 5 or 6 membered heterocyclic nitrogenous nucleus containing a reactive methylene group as shown in the right hand portion of Formula VI. If it is desired to produce a merocarbocyanine dye of the type depicted by Formula VI in which $n$ is 2, then the cyclammonium quaternary salt VII is of the vinyl type, that is, wherein $p=2$. On the other hand, if it is desired to produce a merodicarbocyanine dye, the cyclammonium quaternary salt of Formula VII is selected in which $p$ is equal to 3, the so-called 1,3-butadienyl types previously alluded to. The condensations for producing the merocarbocyanine dyes of Formula VI are advantageously effected in the presence of an acid binding agent of the type mentioned above such as trialkylamines (e.g., triethylamine, etc.) and an inert diluent such as 1,4-dioxane, acetic anhydride, a lower molecular weight alcohol such as propyl alcohol, ethyl alcohol or the like.

Typical cyclic keto methylene ring systems which can be utilized in preparing the merocyanines of Formula CI include a rhodanine nucleus, a 2-thio-2,4-oxazolidinedione nucleus, a pyrazolone nucleus, a 2-thiohydantoin nucleus, etc.

The following examples will serve to illustrate the preparation of the intermediates employed in manufacturing sensitizing dyes and photographic emulsions sensitized with these dyes.

EXAMPLE 1

Preparation of 2-methyl-4,5-tetrahydrobenzo-benzoxazole

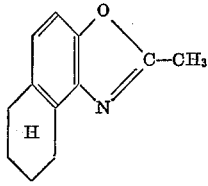

(a) 1 - [(4'-sulfo-)-phenylazo-] - 2-tetralo.—Seventeen and three-tenths grams sulfanilic acid are dissolved in 200 ml. water containing 5.2 grams sodium carbonate monohydrate. 30 ml. HCl are added and the solution cooled to 10°. Diazotize with grams $NaNO_2$ in 20 ml. water below $+15°$ until the test with KI-starch remains positive five minutes after the last addition. 14.8 grams 2-tetralol are dissolved in 200 ml. water containing 21.6 grams sodium carbonate monohydrate and 15 grams 30% sodium hydroxide solution. The tetralol solution is cooled to 3° and the suspension of the diazotized sulfanilic acid is added with stirring within 15 minutes. The temperature during the addition is kept below 8°. Stirring was continued for one hour at room temperature. After standing overnight, the azo dye was filtered off and recrystallized from boiling water. Yield: 20.3 grams (air dry).

Analysis.—Calcd.: N, 7.90%. Found: N, 8.31%.

(b) 1-amino-2-tetralol.—Thirty-three and six-tenths grams of 1-[(4'-sulfo-)-phenylazo-]-2-tetralol are dissolved in 300 ml. 4 N NaOH and heated on the steambath to 70–80°. Sodium hydrosulfite is added until the color of the solution changes to a faint yellow. Stirring and heating is continued for 15 minutes after the solution is decolorized. The solution is cooled to room temperature and acidified with acetic acid. The solid is filtered and recrystallized from alcohol-water. Yield: 17.1 grams; MP. 150—151.

Analysis.—Calcd.: N, 8.62%. Found: N, 8.38%.

(c) 2 - methyl - 4,5 - tetrahydrobenzo-benzoxazole.—Forty-eight grams 1-amino-2-tetralol in 150 ml. acetic anhydride are refluxed for two hours. The solvents are distilled off slowly; the temperature is increased until the inside temperature reaches 280°. Hold for 30 minutes at this temperature. Cool to room temperature and distill in vac., B.P., 162°/12 mm. Yield: 37.5 grams (distilled twice); $n_D^{24}$: 1.5655. Picrate: M.P.: 166–168°.

Analysis.—Calcd.: C, 51.92%; H, 3.87% (of picrate). Found: C, 51.96%; H, 3.88%.

EXAMPLE 2

Preparation of 2,3 - dimethyl - 4,5 - tetrahydrobenzobenzoxazolium iodide

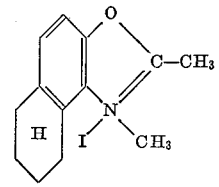

A mixture of 15 grams 2-methyl-4,5-tetrahydrobenzobenzoxazole and 40 ml. methyl iodide is kept in a bomb at 112° overnight. The oily product is triturated with ether and solidified with ether-acetone (2:1). Yield: 16.4 grams, M.P.: 136–137 (from isopropanol).

Analysis.—Calcd.: N, 4.25%. Found: N, 4.08%.

EXAMPLE 3

Preparation of 2-($\beta$-anilinovinyl)-3-methyl-4,5-tetrahydrobenzo-benzoxazolium iodide

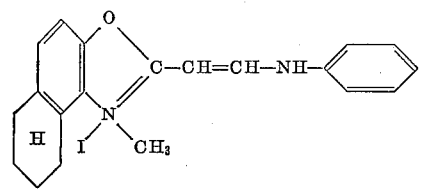

Eleven and a half grams 3-methyl-4,5-tetrahydrobenzobenzoxazolium iodide and 8.6 grams diphenylformamidine are kept for 10 minutes at 131°. Trituration with ether yields 16.3 grams of a yellow solid. M.P.: 265–266 (from alcohol).

Analysis.—Calcd.: N, 6.48%. Found: N, 6.54%.

EXAMPLE 4

Preparation of 3,3' - dimethyl-5' - dimethylamino - 4,5-tetrahydrobenzo-oxathiadiazolocarbocyanine iodide

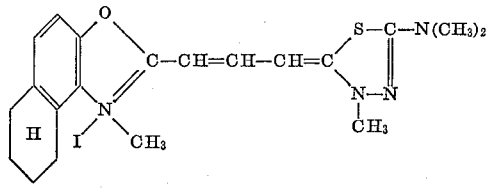

Nine-tenths gram of 2-($\beta$-anilinovinyl)-3-methyl-4,5-tetrahyorobenzo-benzoxazolium iodide and 0.6 gram of 2,3 - dimethyl-5-diethylamino-1,3,4-thiadiazolium iodide in 5 ml. isopropanol containing 1 ml. acetic anhydride and 0.4 ml. triethylamine were stirred at room temperature for 10 minutes and then gently boiled for five minutes. After cooling, ether was added carefully until, upon scratching, crystallization started. After one hour in an ice bath, the product was filtered off and boiled out twice with 6 ml. of isopropanol. The yield of the purified dye was 0.38 gram; M.P. 242–244° after recrystallization from methanol. A methanol solution of the dye showed an absorption maximum at 511 m$\mu$. The dye sensitized a silver bromoiodide emulsion to 590 m$\mu$ with a sensitivity maximum at 540 m$\mu$.

EXAMPLE 5

Preparation of 3,3',4' - trimethyl-4,5 - tetrahydrobenzoxathiozolo-carbocyanine iodide

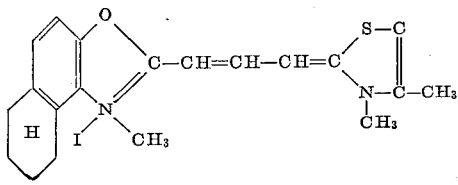

Nine-tenths gram of 2-(β-anilinovinyl) - 3 - methyl-4,5-tetrahydrobenzo - benzoxazolium iodide and 0.5 gram of 2,3,4-trimethylthiazolium iodide in 8 ml. isopropanol containing 1 ml. acetic anhydride and 0.4 ml. triethylamine were stirred at room temperature for five minutes and then refluxed for five minutes. After cooling, the reaction mixture was centrifuged; the solvents were decanted and the crude dye twice boiled out with isopropanol. The yield of the purified dye was 0.41 gram; M.P.: 263–264° after recrystallization from ethanol. A methanol solution of the dye showed an absorption maximum at 517 mµ. The dye sensitized a silver bromoiodide emulsion to 605 mµ, with a maximum at 550 mµ.

EXAMPLE 6

Preparation of 3'-ethyl-3-methyl-4,5-tetrahydrobenzooxathio-carbocyanine iodide

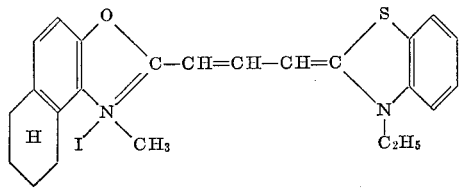

Forty-five hundredths gram 2-(β-anilinovinyl)-3-methyl-4,5 - tetrahydrobenzo-benzoxazolium iodide and 0.3 gram 3-ethyl-2-methylbenzothiazolium iodide in 3 ml. isopropanol containing 0.6 ml. acetic anhydride and 0.2 ml. triethylamine were stirred at room temperature for eight minutes and then heated briefly on the steambath. Upon cooling, the dye crystallized out; it was separated by centrifugation and twice boiled out with isopropanol. The yield of the purified dye was 0.18 gram; M.P.: 258–261° after recrystallization from pyridine. A methanol solution of the dye showed an absorption maximum at 520 mµ. The dye sensitized a silver bromoiodide emulsion to 610 mµ, with a maximum at 555 mµ.

EXAMPLE 7

Preparation of 5 - [3' - methyl - 4',5' - tetrahydrobenzobenzoxazolylidene ethylidene] - 1 - phenyl - 3 - ethylthiohydantoin

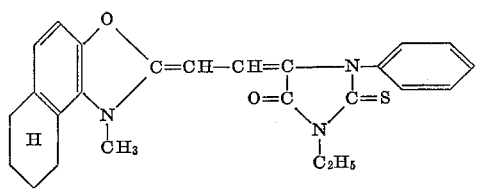

Nine-tenths gram of 2 - (β - anilinovinyl) - 3 - methyl-4, 5 - tetrahydro - benzo - benzoxazolium iodide and 0.45 gram 1-phenyl-3-ethyl-thiohydantoin in 4 ml. dimethylformamide containing 1 ml. acetic anhydride and 0.4 ml. triethyl-amine were stirred at room temperature for five minutes and then refluxed for five minutes. After cooling, the reaction mixture was centrifuged; the solvents were decanted and the crude dye twice boiled out with isopropanol. The yield of the purified dye was 0.25 gram; M.P.: 290–291° after recrystallization from tetradrofuran. A methanol solution of the dye showed an absorption maximum at 490 mµ. The dye sensitized a silver bromoiodide emulsion to 590 mµ, with a miximum at 538 mµ.

EXAMPLE 8

Preparation of -5[3'-methyl-4',5'-tetrahydrobenzo-benzoxalylidene ethylidene]-3-ethylrhodanine

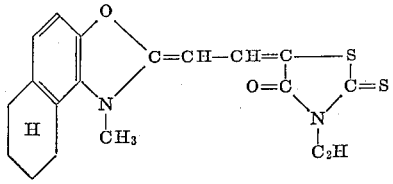

Nine-tenths gram of 2 - (β - anilinovinyl) - 3 - methyl-4, 5 - tetrahydro - benzo - benzoxazolium iodide and 0.35 gram N-ethylrhodanine in 5 ml. pyridine containing 1 ml. acetic anhydride and 0.4 ml. triethylamine were stirred at room temperautre for 10 minutes and then gently refluxed for five minutes. After cooling, the reaction mixture was centrifuged, the solvents were decanted and the crude dye twice boiled out with isopropanol. The yield of the purified dye was 0.25 gram; M.P.: 266–267° from tetrahydrofuran. A methanol solution of the dye showed an absorption maximum at 498 mµ. The dye sensitized a silver bromoiodide emulsion to 600 mµ, with a maximum at 545 mµ.

EXAMPLE 9

Preparation of 3,5'-dimethyl-3'-ethyl-4,5-tetrahydrobenzo-oxathiodiazolo-carbocyanine iodide

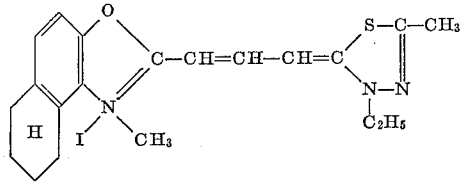

Nine-tenths gram of 2 - (β - anilinovinyl) - 3 - methyl-4, 5 - tetrahydrobenzo - benzoxazolium iodide and 0.54 gram 2,5-dimethyl-3-ethylthiodiazolium iodide in 5 ml. methanol containing 1 ml. acetic anhydride and 0.4 ml. triethylamine were stirred at room temperature for five minutes and then gently refluxed for five minutes. After cooling, ether was added until upon scratching crystallization started. After cooling for one hour in an ice bath, the product was filtered and boiled out twice with 5 ml. in propanol. The yield of the purified dye was 0.31 gram; M.P.: 265–266° after recrystallization from methanol. A methanol solution of the dye showed an absorption maximum at 501 mµ. The dye sensitized a silver bromoiodide emulsion to 585 mµ, with a sensitizing maximum at 540 mµ.

EXAMPLE 10

Preparation of 1'-ethyl-3,3'-trimethyl-4,5-tetradrobenzooxaindolenino-carbocyanine iodide

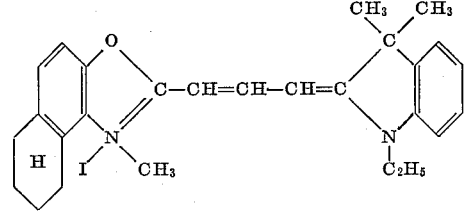

Nine-tenths gram of 2 - (β - anilinovinyl) - 3 - methyl-4, 5 - tetrahydrobenzo - benzoxazolium iodide and 0.62 gram of 1 - ethyl - 2,3,3 - trimethyl indoleninium iodide in 4 ml. isopropanol containing 1 ml. acetic anhydride and 0.4 ml. triethylamine were stirred at room temperature for five minutes and then refluxed for five minutes. The dye which separated upon cooling was boiled out twice with isopropanol. The yield of the purified dye was 0.34 gram;

M.P.: 231–233° after recrystallization from methanol. A methanol solution of the dye showed an absorption maximum at 509 mμ. The dye sensitized a silver bromoiodide emulsion to 595 mμ, with a maximum at 545 mμ.

EXAMPLE 11

Preparation of 3,3'-dimethyl-4,5,4',5'-di[tetrahydrobenzo-]oxacarbocyanine iodide

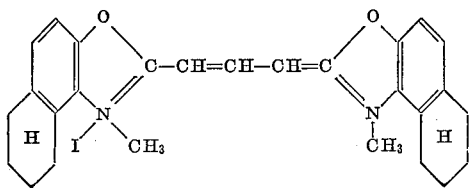

Nine-tenths gram of 2 -(β-anilinovinyl)-3-methyl-4,5-tetrahydrobenzo-benzoxazolium iodide and 0.66 gram 2,3-dimethyl-4,5-tetrahydrobenzo-benzoxazolium iodide in 4 ml. isopropanol containing 1 ml. acetic anhydride and 0.4 ml. triethylamine were stirred at room temperature for five minutes and then gently refluxed for ten minutes. After cooling in ice, the reaction mixture was centrifuged, the solvents were decanted and the crude dye twice boiled out with isopropanol. The yield of purified dye was 0.24 gram. A methanol solution of the dye showed an absorption maximum at 488 mμ. The dye sensitized a silver chlorobromide emulsion to 560 mμ, with a maximum at 514 mμ.

EXAMPLE 12

Preparation of 2-methyl-5,6-tetrahydrobenzobenzoxazole

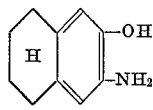

Ten grams of 1-bromo-2-hydroxy-3 nitro-5,6,7,8-tetrahydronaphthalene is hydrogenated in 20 milliliters anhydrous ethanol at room temperature. (50 p.s.i.; Pd on charcoal). After the theoretical uptake of hydrogen (40–50 minutes) the catalyst is filtered off and the alcoholic solution diluted with two volumes of water. The product, 3-amino-2-hydroxy-5,6,7,8 - tetrahydronaphthalene, crystallizes out upon the addition of 2 N ammonium hydroxide to a pH of about 8 to 9. It is filtered, washed with water and dried and provided 5.4 grams having a melting point of 195°–198° C. The melting point is raised to 201°–203° C., upon recrystallization from ethanol. The product was found to have a nitrogen content of 8.77% as compared to a calculated value of 8.5%.

A mixture of 12.3 grams of 3-amino-2-hydroxy-5,6,7,8-tetrahydronaphthalene and 35 milliliters acetic anhydride is refluxed for two hours. The excess of acetic anhydride is distilled off under normal pressure and the residue held at 250° C. for three hours. Distillation at 0.5 mm. of Hg yields 10.1 grams product having a boiling point of 100°–104° C. and a melting point of 81°–83° C. (from 80% methanol).

Analysis.—Theory: N, 7.47%; C, 76.97%; H, 6.99%. Found: N, 7.33%; C, 76.74%; H, 6.89%. The azole yields a picrate having a melting point of 168%-171° C. (from methanol).

EXAMPLE 13

Preparation of 2,3-dimethyl-5,6-tetrahydrobenzobenzoxazolium p-toluenesulfonate

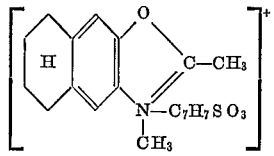

A mixture of 0.93 gram of 2-methyl-5,6-tetrahydrobenzobenzoxazole and 0.93 gram of methyl-p-toluenesulfonate is kept at 131° for 0.5 hour. Trituration with ether solidifies the salt in a yield of 1.7 grams having a melting point of 206°–208° C. (from isopropyl alcohol and ether).

EXAMPLE 14

Preparation of 3-ethyl-2-methyl-5,6-tetrahydrobenzobenzoxazolium iodide

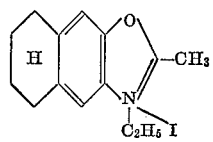

A mixture of 2 grams of 2-methyl-5,6-tetrahydrobenzobenzoxazole and 5 milliliters ethyl iodide is kept in a bomb at 112° overnight. The oily product is triturated with ether and solidified with ether/acetone (2:1). Yield: 3.0 grams; melting point: 188°–189° (from n-propanol and ether).

EXAMPLE 15

Preparation of 2-(β-anilinovinyl)-3-ethyl-5,6-tetrahydrobenzobenzoxazolium iodide

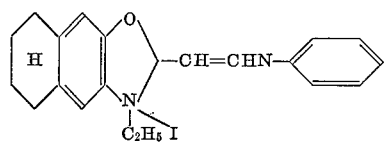

Two grams of 3-ethyl-2-methyl-5,6-tetrahydrobenzobenzoxazole and 2 grams of diphenylformamidine are fused for 10 minutes at 131° C. Trituration with ether yields 2.3 grams of a yellow solid having a melting point of 293°–295° C. (from ethanol).

EXAMPLE 16

Preparation of 3,3'-diethyl-5,6-tetrahydrobenzo-oxathiacarbocyanine iodide

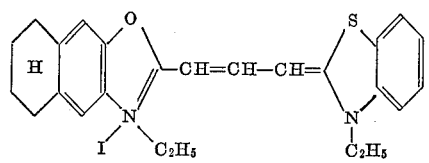

Forty-five hundredths gram of 2-(β-anilinovinyl)-3-ethyl-5,6-tetrahydrobenzobenzoxazolium iodide and 0.3 gram of 3-ethyl-2-methyl-benzothiazolium iodide in 5 milliliters pyridine containing 0.6 milliliter acetic anhydride and 0.2 milliliter triethylamine are stirred at room temperature for five minutes and then heated for five minutes on the steambath. After cooling to room temperature, the dye is brought out by the careful addition of ether. It is separated by centrifugation, the solvents are decanted and the crude dye twice boiled out with iso-propanol. The yield of the purified dye is 0.31 gram; melting point: 306°–308° C. (from pyridine). A methanol solution of the dye has an absorption maximum at 525 mμ. The dye sensitizes a silver bromoiodide emulsion to 600 mμ, with a maximum at 560 mμ.

EXAMPLE 17

Preparation of 3,3'-diethyl-5,6-tetrahydrobenzo-oxathiazolino-carbocyanine iodide

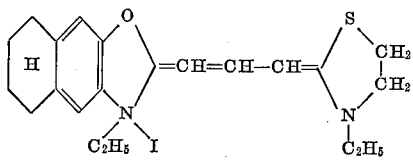

The dye is prepared in an identical condensation as Example 16 by replacing 0.3 gram of 3-ethyl-2-methylbenzothiazolium iodide with 0.26 gram of 3-ethyl-2-methyl-thiazolinium iodide. The yield of the purified dye is 0.25 gram; melting point: 272° C. (from n-butanol). A methanol solution of the dye has an absorption maximum at 473 mμ. The dye sensitizes a silver bromoiodide emulsion to 545 mμ, with a maximum at 510 mμ.

EXAMPLE 18

Preparation of 3'-benzyl-3-ethyl-4'-methyl-5,6-tetrahydrobenzo-oxathiazolo-carbocyanine iodide

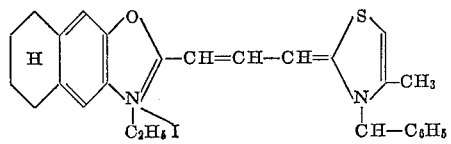

The dye is prepared in an identical condensation as Example 16 by replacing 0.3 gram of 3-ethyl-2-methyl-benzothiazolium iodide with 0.29 gram of 3-benzyl-2,4-dimethyl-thiazolium bromide. The dye separates without the addition of ether. The yield of the purified dye is 0.35 gram; melting point: 206°–207° C. (from i-propanol). A methanol solution of the dye has an absorption maximum at 525 mμ. The dye sensitizes a silver bromoiodide emulsion to stop 600 mμ. with a maximum at 560 mμ.

EXAMPLE 19

Preparation of 3,3'-diethyl-5'-methyl-5,6-tetrahydro-benzooxathiadiazolo-(1,3,4)-carbocyanine iodide

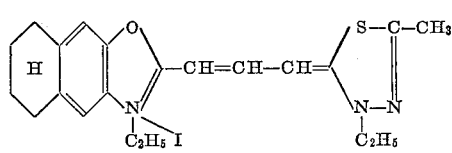

The dye is prepared in an identical condensation as Example 16 by replacing 0.3 gram of 3-ethyl-2-methyl-benzothiazolium iodide with 0.27 gram 3-ethyl-2,5-dimethyl-thiadiazolium (1,3,4) iodide. The dye separates without the addition of ether. The yield of the purified dye is 0.35 gram; melting point: 275°–276° C. (from methanol and iso-propanol). A methanol solution of the dye has an absorption maximum at 506 mμ. The dye sensitizes a silver bromoiodide emulsion to 695 mμ. with a maximum at 548 mμ.

EXAMPLE 20

Preparation of 3-ethyl-3'-methyl-5'-dimethylamino-5,6-tetrahydrobenzoxathiadiazolo (1,3,4) carbocyanine iodide

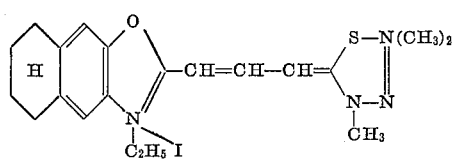

The dye is prepared in an identical condensation as used in Example 16 by replacing 0.3 gram of 3-ethyl-2-methyl-benzothiazolium iodide by 0.32 gram of 2,3-dimethyl-5-dimethylamino-thiadiazolium-(1,3,4) iodide. The yield of the purified dye is 0.31 gram; melting point: 236°–237° C. (from 70% methanol). A methanol solution of the dye has an absorption maximum at 514 mμ. The dye sensitizes a silver bromoiodide emulsion to 585 mμ. with a maximum at 552 mμ.

EXAMPLE 21

Preparation of 3,3'-diethyl-5',6'-dimethyl-5,6-tetrahydrobenzo-oxacarbocyanine iodide

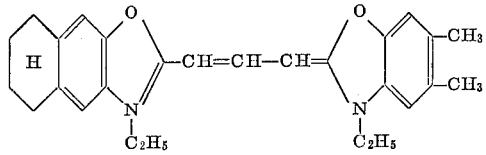

The dye is prepared in an identical condensation as Example 16 by replacing 0.3 gram of 3-ethyl-2-methyl-benzothiazolium iodide with 0.31 gram of 3-ethyl-2,5,6-trimethyl-benzoxazolium iodide. The yield of the purified dye is 0.18 gram; melting point: 280°–281° C. (from methanol). A methanol solution of the dye has an absorption maximum at 496 mμ. The dye sensitizes a silver bromoiodide emulsion to 560 mμ; with a maximum at 520 mμ.

EXAMPLE 22

Preparation of 3'-(β-carboxyethyl)-3-ethyl-5'-methoxy-5,6-tetrahydrobenzo-oxaselenacarbocyanine iodide The dye is prepared in an identical condensation as Example 16 by replacing 0.3 gram of 3-ethyl-2-methyl-benzothiazolium iodide with 0.41 gram 3-(β-carboxyethyl)-5-methoxy-2 - methyl - benzoselenazolium iodide. The yield of the purified dye is 0.29 gram; melting point: 285°–287° C. (from methanol). A methanol solution of the dye has an absorption maximum at 540 mμ. The dye sensitizes a silver bromoiodide emulsion to 610 mμ. with a maximum at 578 mμ.

EXAMPLE 23

Preparation of 1'-benzyl-3-ethyl-5,6-tetrahydrobenzo-oxa-4'-carbocyanine iodide

The dye is prepared in an identical condensation as Example 16 by replacing 0.3 gram of 3-ethyl-2-methyl-benzothiazolium iodide with 0.31 gram of 1-benzyl-lepidinium bromide. The dye separates without the addition of ether. The yield of the purified dye is 0.47 gram; melting point: 243°–244° C. (from 75% dimethyl-formamide). A methanol solution of the dye has an absorption at 608 mμ. The dye sensitizes a silver bromoiodide emulsion from 570 mμ. to 670 mμ. with a maximum at 644 mμ.

EXAMPLE 24

Preparation of 5-[3'-ethyl-5',6'-tetrahydrobenzo-benzoxazolylidene ethylidene]-3-ethylrhodanine Forty-five hundredths gram of 2(β-anilinovinyl)-3-ethyl-5,6-tetrahydrobenzo-benzoxazolium iodide and 0.18 gram of 3-ethyl-rhodanine in 4 milliliters pyridine containing 0.5 milliliter acetic anhydride and 0.2 milliliter triethylamine are stirred at room temperature for five minutes. After cooling, the reaction mixture is centrifuged, the solvents are decanted and the crude dye twice boiled out with methanol. The yield of the purified dye is 0.31 gram; melting point: 300°–302° C. (from tetrahydrofuran). A methanol solution of the dye has an absorption maximum at 500 mμ. The dye sensitizes a silver bromoiodide emulsion to 610 mμ. with a maximum at 550 mμ.

EXAMPLE 25

Preparation of 5-[3'-ethyl-5',6'-tetrahydrobenzo-benzoxazolylidene ethylidene]-3-ethyl-1-phenyl thiohydantoin

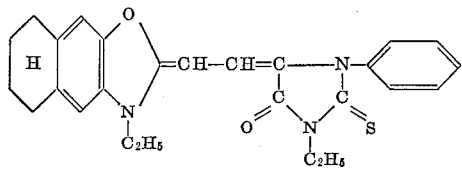

Forty-five hundredths gram of 2-(β-anilinovinyl)-3-ethyl-5,6-tetrahydrobenzo-benzoxazolium iodide and 0.24 gram of 3-ethyl-1-phenyl thiohydantoin in 4 milliliters dimethylformamide containing 0.5 milliliter acetic anhydride and 0.2 milliliter triethylamine are stirred for five minutes at room temperature and heated for five minutes on a steam-bath. After cooling, water is added to bring the dye out. The crude dye is purified by boiling it out twice with methanol. Yield: 0.25 gram; melting point: 218°–220° C. (from n-butanol). A methanol solution of the dye has an absorption maximum at 490 mμ. The dye sensitizes a silver bromoiodide emulsion to 580 mμ with a maximum at 540 mμ.

EXAMPLE 26

Preparation of 2-methyl-6,7-tetrahydrobenzobenzoxole

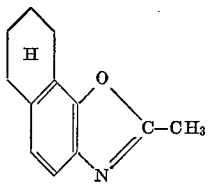

5,6,7,8-tetrahydro-1-naphthol was prepared from 1-naphthol in about 40% yield using the method of Musser and Adkins, J. Am. Chem. Soc. 60, 664 (1938). The method uses Raney nickel catalyst in ethanol at 150° C. at 100–200 atmospheres of hydrogen for a period of 0.7 hour. The acidic portion of the product was purified by passing a petroleum ether solution through a column of Florisil adsorbent. Recrystallized from petroleum ether, the compound melts at 69° C.

1 - hydroxy-2-nitro-5,6,7,8-tetrahydro-naphthalene was prepared using a method described by Green and Rowe, J. Chem. Soc. 113, 968 (1918). The product can be recrystallized from ether and melts at 56° C. This compound was reduced by low pressure hydrogenation using Raney nickel catalyst to yield an amine which was not isolated. The amine was refluxed with excess acetic anhydride for two hours after which the acetic acid and anhydride were distilled off leaving 1-acetoxy-2-acetamido-5,6,7,8-tetrahydro naphthalene. This was heated in a metal bath to 280° C. for 3 hours after which the product was distilled in vacuum. The 2-methyl-6,7-tetrahydrobenzobenzoxazole boiled at 137° C. at 2 mm.

Analysis.—Picrate, calculated for $C_{18}H_{16}O_8N_4$. Theory: C, 52.00%; H, 3.85%; N, 13.47%. Found: C, 52.25%; H, 3.75%; N, 13.60%.

EXAMPLE 27

Preparation of 2-methyl-6,7-tetrahydrobenzobenzoxazole methiodide

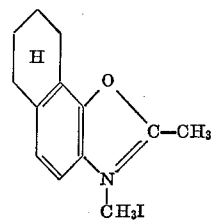

2 - methyl - 6,7 - tetrahydrobenzobenzoxazole methiodide was prepared by mixing 1 gram 2-methyl-6,7-tetrahydrobenzobenzoxazole and 4 milliliters methyl iodide in a bomb and heating to 115° C. for 24 hours. The solid which remained was ground under ether and filtered to yield 1.5 grams. After recrystallization from methanol-ether mixture the compound melted at 189–190° C.

Analysis.—Calculated for $C_{13}H_{16}INO$. Theory: C, 47.40%; H, 4.86%; I, 38.60%. Found: C, 47.65%; H, 4.77%; I, 38.29%.

EXAMPLE 28

Preparation of 2-anilinovinyl-6,7-tetrahydrobenzobenzoxazole methiodide

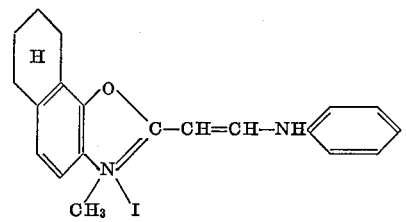

The 2 - anilinovinyl - 6,7 - tetrahydrobenzobenzoxazole methiodide was prepared by heating a mixture of 1 gram of 2-methyl-6,7-tetrahydrobenzobenzoxazole methiodide and 1.5 grams diphenylformamidine to 130° C. for 10 minutes. The cooled product was ground under ether and filtered. The yield of orange solid was 1.5 grams. After recrystallization from methanol-ether mixture, it melted at 246° C.

EXAMPLE 29

Preparation of 5-[3'-methyl-6',7'-tetrahydrobenzo-2'(3'H)benzoxazlylidene-ethylidene]-3-ethyl rhodanine

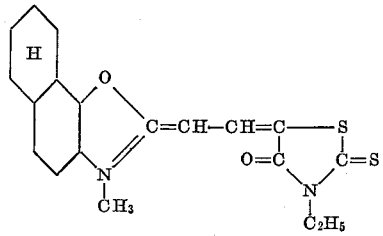

A mixture of 0.43 gram of 2-anilinovinyl-6,7-tetrahydrobenzobenzoxazole methiodide and 0.18 gram of 3-ethyl-rhodanine in 5 milliliters of isopropanol and 10 drops each of acetic anhydride and triethylamine was heated to 5 to 10 minutes on a steam bath. The chilled reaction mixture was centrifuged and the dye washed with ether. After 3 recrystallizations from acetone, the dye melted with decomposition at 290° C. A methanol solution of the dye has an absorption maximum at 498 mμ. The dye sensitizes a silver bromoiodide emulsion in the range of 500–600 mμ with a maximum at 560 mμ.

EXAMPLE 30

Preparation of 3'benzyl-3,4'-dimethyl-6,7-tetrahydrobenzo oxathiazole carbocyanine iodide

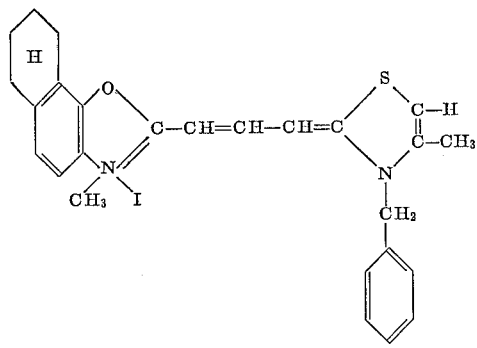

3' - benzyl-3,4'-dimethyl-6,7-tetrahydrobenzo oxathiazole carbocyanine iodide was prepared from 2-anilinovinyl-6, 7-tetrahydrobenzobenzoxazole methiodide and 3-benzyl 2-4-dimethyl thiazole bromide in isopropanol, triethylamine, and acetic anhydride. After recrystallization from isopropanol the dye melted at 197–198° C. A methanol solution of the dye has an absorption maximum at 522 mμ. The dye sensitizes a silver bromoiodide emulsion in the range of 500–800 mμ with maximum at 560 mμ.

EXAMPLE 31

Preparation of 3,3'-dimethyl-5'-diethylamino-6,7-tetrahydrobenzooxathiadazolo-(1',3',4') - carbocyanine iodide

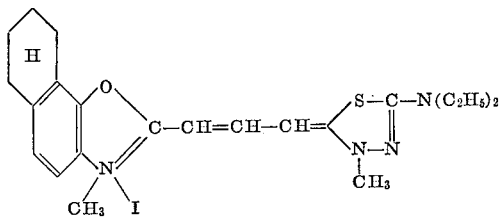

3,3'-dimethyl-5'-diethylamino - 6,7 - tetrahydrobenzo oxa-1',3',4'-thiadiazolo carbocyanine iodide was prepared from 2 - anilinovinyl - 6,7 - tetrahydrobenzobenzoxazole methiodide and 2,3 - dimethyl-5-diethylamino-1,3,4-thiadiazole iodide in isopropanol, triethylamine and acetic anhydride. After recrystallization from ethanol, the dye melted at 252° C.

EXAMPLE 32

Preparation of 5-(3'-methyl-6',7'-tetrahydrobenzo-2'(3'H) - benzoxazolylidene - ethylidene)-3-ethyl-1-phenyl thiohydantoin

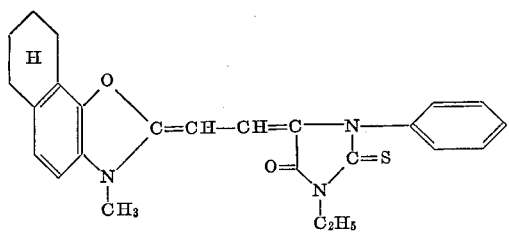

This dye was prepared using the procedure given in Example 31 by employing 3-ethyl-1-phenyl-thiohydantoin in place of 2,3-dimethyl-5-diethylamino-1,3,4-thiadiazole iodide. A methanol solution of the dye has an absorption maximum at 488 mμ. The dye sensitizes a silver bromoiodide emulsion in the range of 500–580 mμ with a maximum at 540 mμ. The dye produced was characterized by a melting point of 236° C. (from ethanol).

EXAMPLE 33

Preparation of 1'-ethyl-3-methyl-6,7-tetrahydrobenzooxa-4'-carbocyanine iodide

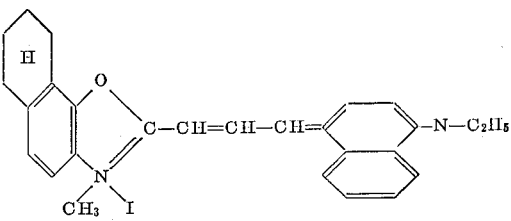

This dye was prepared using the procedure given in Example 31 by employing lapidine ethiodide in place of thiadiazole iodide of that example. A methanol solution of the dye has an absorption maximum at 602 mμ. The product was characterized by a melting point of 261° C. (from ethanol).

EXAMPLE 34

Preparation of 3'-ethyl-3-methyl-6,7-tetrahydrobenzo oxathiacarbocyanine iodide

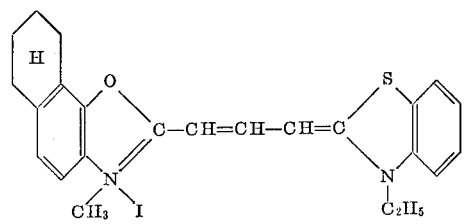

This dye was prepared using the procedure given in Example 31 by employing 2-methyl-3-ethyl-benzothiazolium iodide in place of the thiadiazole iodide of that example. A methanol solution of the dye has an absorption maximum at 523 mμ.

EXAMPLE 35

Preparation of 3,3'-dimethyl-9-athyl-6,7,6'7'-bis-tetrahydrobenzooxacarbocyanine iodide

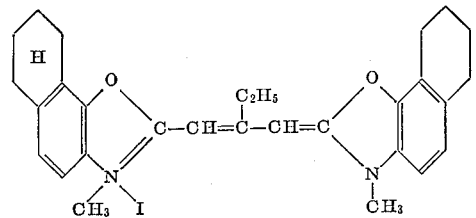

This dye was prepared by condensing two moles of 2-methyl - 6,7 - tetrahydrobenzobenzoxazole methiodide with 1,1,1-triethoxy-propane in the presence of triethylamine. A methanol solution of the dye has an absorption maximum at 497 mμ. The dye sensitizes a silver bromoiodide emulsion in the range of 490–560 mμ with a maximum at 525 mμ. The dye produced was characterized by a melting point of 266° C. (from ethanol).

EXAMPLE 36

Preparation of 1-ethyl-3,3,3'-trimethyl-6',7'-tetrahydrobenzo-oxaindolineno-carbocyanine iodide

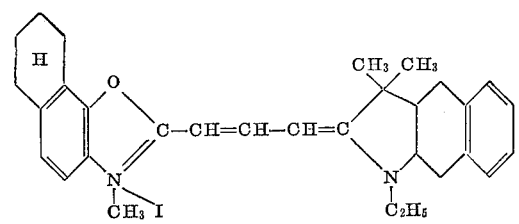

This dye was prepared using the procedure given in Example 31 by employing 1-ethyl-2,3,3-trimethylindolinium iodide in place of the thiadiazole iodide of that example.

17

A methanol solution of the dye has an absorption maximum at 510 mμ. The dye sensitizes a silver bromoiodide emulsion in the range of 500–570 mμ, with a maximum at 535 mμ. The dye produced was characterized by a melting point of 256° C. (from ethanol).

EXAMPLE 37

Preparation of 3-ethyl-3',5-dimethyl-6',7'-tetra-hydro-benzo-oxa-thiadiazolo(1,3,4)-carbocyanine iodide

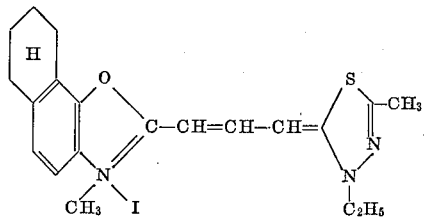

This dye was prepared using the procedure given in Example 31 by employing 3-ethyl-2,5-dimethyl thiadiazolium iodide in place of the thiadiazole iodide of that example. A methanol solution of the dye has an absorption maximum at 502 mμ. The dye sensitizes a silver bromoiodide emulsion in the range of 500–580 mμ with a maximum at 545 mμ. The dye produced was characterized by a melting point of 236° C. (from ethanol).

EXAMPLE 38

Preparation of 2-methyl-3-carboxyethyl-6,7-tetrahydro-benzobenzoxazole iodide

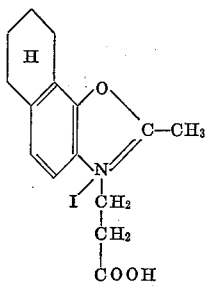

A mixture of 3.8 grams (0.020 mole) of Compound I and 4.4 grams (0.022 mole) B-iodopropionic acid was heated for 15 hours on a steam bath. After cooling, the solid was dissolved in acetone and precipitated by addition of ether. This yielded 2.8 grams of Compound XIII. After treating the product again with acetone, then ether, it melted a 207° C.

EXAMPLE 39

Preparation of 2-anilinovinyl-3-carboxyethyl-6,7-tetrahydrobenzobenzoxazole iodide

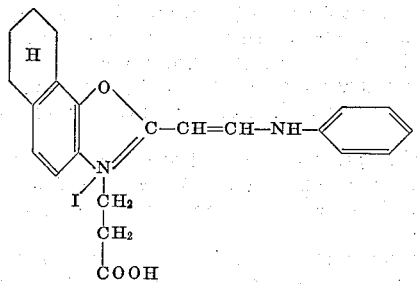

A mixture of 3.87 grams (0.01 mole) Compound XIII and 1.96 grams (0.01 mole) diphenylformamidine was heated for 15 minutes at 130° C. After cooling, the solid was ground under ether and filtered. The yield was 1.6 grams of product which melted at 240° C.

18

EXAMPLE 40

Preparation of 5-[3'-β-carboxethyl-6',7'-tetrahydrobenzo-2'(3'H)benzoxazolylidine-ethylidene]-3-ethylrhoanine

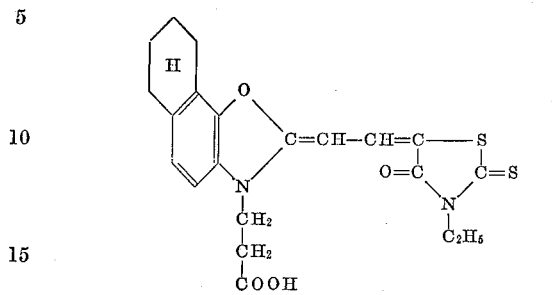

0.49 gram (0.001 mole) of Compound XIV and 0.18 gram (0.0011 mole) of 3-ethylrhodanine were mixed with 3 milliliters isopropanol. Ten drops each of acetic anhydride and triethylamine were added and the reaction mixture heated 15 minutes on a steam bath. The dye precipitated from the cooled mixture and was separated by centrifugation. After boiling out several times with isopropanol, the dye was recrystallized from acetone giving a product melting at 269° C. A methanol solution of the dye has an absorption maximum at 500 mμ. The dye sensitizes a silver bromoiodide emulsion in the range of 500–600 mμ with a maximum of 560 mμ.

EXAMPLE 41

Preparation of anhydro-2-methyl-3-(3'-sulfopropyl)-6,7-tetrahydrobenzobenzoxazole hydroxide

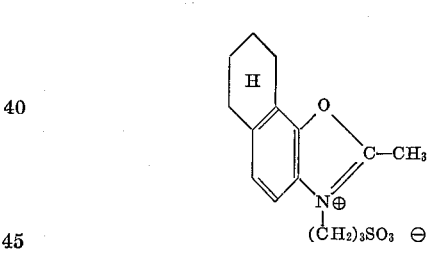

1.0 gram (0.0053 mole) of Compound I and 1.0 gram (0.0082 mole) n-propyl-sulfone were heated together for 7 hours at 110° C.–115° C. After cooling, the solid was ground under ether and yielded 1.5 grams of product. After recrystallization from acetonitrile, the product melted at 246° C.

EXAMPLE 42

Preparation of anhydro-2-anilinovinyl-3- 3'-sulfopropyl)-6,7-tetrahydrobenzobenzoxazole hydroxide

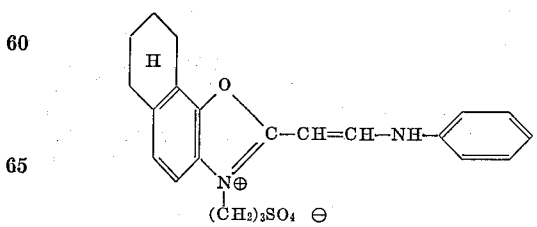

1.55 grams (0.005 mole) of Compound XVI and 1.96 grams (0.01 mole) of diphenylformamidine were mixed and heated to 130° C. for 30 minutes. This yielded upon cooling and grinding under ether, 1.7 grams of Compound XVII. Recrystallized from methanol-ether, it melted at 253° C.

EXAMPLE 43

Preparation of 5-[3'-(3"sulfopropyl)-6',7'-tetrahydrobenzo - 2'(3'H)benzoxazolylidene - ethylidene] - 2-ethylrhodanine

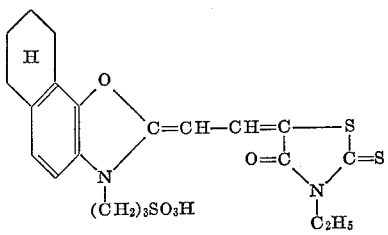

This dye was prepared in a manner similar to Example 29 by employing anhydro-2-anilinovinyl-3-(3'-sulfopropyl)-6,7-tetrahydrobenzobenzoxazole hydroxide in place of the methiodide employed in that example. A methanol solution of the dye has an absorption maximum at 500 mμ. The dye sensitizes a silver bromoiodide emulsion in the range of 500–600 mμ with a maximum at 560 mμ. The dye when recrystallized from acetone had a melting point of 229° C.

EXAMPLE 44

Preparation of anhydro-3-benzyl-3'-(3"-sulfopropyl)-4-methyl - 6',7' - tetrahydrobenzo - oxathiazolo - carbocyanine hydroxide

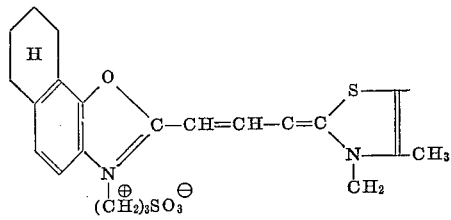

This dye was prepared by using the procedure given in Example 30 by employing anhydro-2-anilinovinyl-3-(3'-sulfopropyl)-6,7-tetrahydrobenzobenzoxazole hydroxide in place of the methiodide of that example. A methanol solution of the dye has an absorption maximum at 504 mμ. The dye sensitizes a silver bromoiodide emulsion in the range of 500–580 mμ with a maximum at 560 mμ. The dye produced was recrystallized from isopropanol and had a melting point of 265° C.

The new tetrahydrobenzo-benzoxazole dyes described herein sensitize photographic emulsions in a useful manner. In blending or incorporating the dyes with a photographic emulsion, the customary procedures may be resorted to. For instance, it may be convenient to employ solutions of these novel dyes in appropriate solvents such as methanol, ethanol, or acetone. Methanol has for instance, proven satisfactory as a solvent for the majority of the dyes.

The new dyes may be used in a concentration which can vary over a wide limit such as from about 5 to about 100 milligrams per liter of liquid emulsion. The concentration of sensitizing dye employed for any particular emulsion is not a fixed factor but depends to a great extent on the type of silver halide emulsion employed. This is a situation of which the art is cognizant and any skilled operator is apprised of how to make adjustments in the concentrations of sensitizing dye solutions in order to adapt them to a particular type of emulsion.

A typical procedure whereby the dyes can be blended in a gelatino silver halide emulsion involves the following: A quantity of the dye such as from 5 to 100 milligrams is taken up in a conventional solvent such as methyl alcohol which is then slowly added to about 1 liter of the emulsion with stirring. It is advisable to continue stirring during the interval when the dye solution is added to the emulsion. As pointed out above, the quantity of dye is dependent to a certain extent on the type of gelatino silver halide emulsion. For instance, the fine grain emulsions, it has been found that somewhat larger concentrations of the dye may be necessary in order to obtain the desired sensitizing effect.

Photographic silver halide emulsions which can advantageously be sensitized with the new dyes are the type customarily employed in the art and includes such well-known types as gelatino silver chloride, gelatino silver chlorobromide, gelatino silver bromide and gelatino silver bromoiodide emulsions.

What we claim is:

1. A photographic silver halide emulsion sensitized with a sensitizing dye having the general formula:

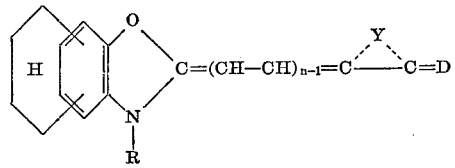

wherein:

represents a tetrahydrobenzo radical fused to the benzoxazole nucleus in one of the positions 4,5-, 5,6- and 6,7-, R represents a lower alkyl group, D is oxygen or sulfur; $n$ is an integer ranging from 2 to 3; and Y represents the hetero atoms necessary to complete a heterocyclic nucleus of from 5 to 6 atoms and selected from the class consisting of rhodanine, thiazolone, oxazoledione, thiohydantoin, thiopyrazolone, thiobarbituric acid and pyrazolone nuclei.

2. A photographic silver halide emulsion according to claim 1, sensitized with a sensitizing dye having the following formula:

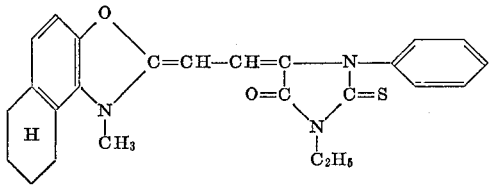

3. A photographic silver halide emulsion according to claim 1, sensitized with a sensitizing dye having the following formula:

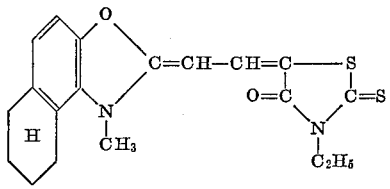

4. A photographic silver halide emulsion according to claim 1, sensitized with 5-[3'-ethyl-5',6'-tetrahydrobenzo-benzoaxazolylidene-ethylident]-3-ethylrhodanine.

5. A photographic silver halide emulsion according to claim 1, sensitized with 5-[3'-ethyl-5',6'-tetrahydrobenzo-benzoaxazolylidene ethylidene]-3-ethyl-1 - phenyl-thiohydantoin.

6. A photographic silver halide emulsion according to claim 1, sensitized with 5-[3'-methyl-6',7'-tetrahydrobenzo - 2'(3'H)-benzoxazolyidene-ethylidene] - 3 - ethyl rhodanine.

7. A photographic silver halide emulsion according to claim 1, sensitized with 5-[3'-methyl - 6',7' - tetrahydrobenzo-2'(3'H)benzo-oxazolylidene-ethylidene] - 3 - ethyl-1-phenyl-thiohydantoin.

8. A photographic silver halide emulsion according to claim 1, sensitized with 5-[3'-β-carboxyethyl-6',7'-tetrahydrobenzo - 2'(3'H)benzoxaolylidine-ethylidene]-3-ethyl rhodanine, 9. A photographic silver halide emulsion according to claim 1, sensitized with 5-[3'-(3''-sulfopropyl)-6',7'-tetrahydrobenzo - 2'(3'H)benzoxazolylidene-ethylidene] - 3-ethyl rhodanine.

References Cited

UNITED STATES PATENTS 2,104,855  1/1938  Dieterle et al. _____ 96—106

FOREIGN PATENTS 427,887  4/1935  Great Britain.

J. TRAVIS BROWN, Primary Examiner

U.S. Cl. X.R.

96—106

Disclaimer 3,490,910.—*Emil B. Rauch* and *Robert T. Shannahan*, Binghamton, and *Arthur Krieger*, Rochester, N.Y. SILVER HALIDE EMULSIONS SENSITIZED WITH CYANINE DYES CONTAINING A TETRAHYDROBENZOBENZOXAZOLE NUCLEUS. Patent dated Jan. 20, 1970. Disclaimer filed Sept. 30, 1982, by the assignee, *Eastman Kodak Co.*

Hereby enters this disclaimer to all claims of said patent.
[*Official Gazette March 8, 1983.*]